(12) United States Patent
Everhart et al.

(10) Patent No.: US 9,218,475 B2
(45) Date of Patent: *Dec. 22, 2015

(54) SCALABLE GROUPS OF AUTHENTICATED ENTITIES

(71) Applicant: NetApp, Inc., Sunnyvale, CA (US)

(72) Inventors: Craig Fulmer Everhart, Pittsburg, PA (US); David Slik, Burnaby (CA)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,429

(22) Filed: Aug. 26, 2014

(65) Prior Publication Data
US 2014/0365767 A1    Dec. 11, 2014

Related U.S. Application Data

(63) Continuation of application No. 13/096,747, filed on Apr. 28, 2011, now Pat. No. 8,850,191.

(51) Int. Cl.
*G06F 21/33* (2013.01)
*G06F 21/44* (2013.01)
*H04L 29/06* (2006.01)
*H04L 9/32* (2006.01)

(52) U.S. Cl.
CPC ............... *G06F 21/33* (2013.01); *G06F 21/44* (2013.01); *H04L 63/0823* (2013.01); *H04L 63/104* (2013.01); *H04L 9/3268* (2013.01); *H04L 63/065* (2013.01)

(58) Field of Classification Search
CPC ....... G06F 21/33; G06F 21/44; H04L 9/3268; H04L 63/104; H04L 63/065
See application file for complete search history.

(56) References Cited

U.S. PATENT DOCUMENTS

| | | | |
|---|---|---|---|
| 6,092,201 A | 7/2000 | Turnbull et al. | |
| 7,028,180 B1 * | 4/2006 | Aull et al. | 713/156 |
| 7,787,865 B2 * | 8/2010 | Willey et al. | 455/411 |
| 2001/0049787 A1 | 12/2001 | Morikawa et al. | |
| 2002/0178356 A1 | 11/2002 | Mattila | |
| 2003/0056093 A1 * | 3/2003 | Huitema et al. | 713/156 |
| 2003/0084311 A1 * | 5/2003 | Merrien et al. | 713/191 |
| 2003/0126464 A1 | 7/2003 | McDaniel et al. | |

(Continued)

OTHER PUBLICATIONS

Ma et al., A New Efficient Group Signature Scheme Based on Linear Codes, Oct. 2001, Ninth IEEE International Conference on Networks, pp. 124-129.*

(Continued)

*Primary Examiner* — Morshed Mehedi
*Assistant Examiner* — Kenneth Chang
(74) *Attorney, Agent, or Firm* — Kacvinsky Daisak Bluni, PLLC

(57) ABSTRACT

Example embodiments provide various techniques for securing communications within a group of entities. In one example method, a request from an entity to join the group is received and a signed, digital certificate associated with the entity is accessed. Here, the signed, digital certificate is signed with a group private key that is associated with a certification authority for the group. The signed, digital certificate is added to a group roster, and this addition is to admit the entity into the group. The group roster with the signed, digital certificate is itself signed with the group private key and distributed to the group, which includes the entity that transmitted the request. Communication to the entity is then encrypted using the signed, digital certificate included in the group roster.

17 Claims, 16 Drawing Sheets

(56) References Cited

U.S. PATENT DOCUMENTS

| | | |
|---|---|---|
| 2003/0177352 A1 | 9/2003 | Camenisch et al. |
| 2004/0054899 A1 | 3/2004 | Balfanz et al. |
| 2004/0064693 A1 | 4/2004 | Pabla et al. |
| 2004/0093493 A1* | 5/2004 | Bisbee et al. ............... 713/156 |
| 2004/0131187 A1 | 7/2004 | Takao et al. |
| 2004/0193919 A1 | 9/2004 | Dabbish et al. |
| 2004/0264697 A1 | 12/2004 | Gavrilescu et al. |
| 2005/0114447 A1 | 5/2005 | Cameron et al. |
| 2007/0150723 A1 | 6/2007 | Estable et al. |
| 2007/0199075 A1 | 8/2007 | Skoric et al. |
| 2009/0222668 A1* | 9/2009 | Zaccone et al. ............... 713/179 |

OTHER PUBLICATIONS

Schmidt et al., Proxy-based Security for the Session Initiation Protocol (SIP), Aug. 2007, Second International Conference on Systems and Networks Communications, pp. 42-47.

* cited by examiner

SCALABLE GROUPS OF AUTHENTICATED ENTITIES

RELATED APPLICATION

This application is a Continuation of U.S. patent application Ser. No. 13/096,747, entitled "SCALABLE GROUPS OF AUTHENTICATED ENTITIES", filed Apr. 28, 2011; the aforementioned priority application being hereby incorporated by reference in its entirety for all purposes.

FIELD

The present disclosure relates generally to information security. In an example embodiment, the disclosure relates to scaling groups of authenticated entities.

BACKGROUND

A cluster is a group of linked systems. As an example, a cluster can be comprised of a group of linked computers that are programmed to work together. Many clusters are deployed to improve performance and availability over that of a single system. Before joining a cluster, the identity of a system needs to be authenticated such that the system can join the cluster, and there are a variety of different certificate-based authentication systems that can provide such services.

Many traditional certificate-based authentication systems are configured with a digital certificate for all the members with which the system has to communicate securely. Even though this type of authentication can be used for an extended period of time for many communication sessions, such traditional certificate-based authentication systems can be difficult to scale. For example, in order to construct a cluster of systems in which any member of the cluster may securely communicate with each other, each pair of systems within the cluster must be separately and manually configured for secure communication. However, adding or removing a system from the cluster becomes increasing tedious as every other system within the cluster must have its configuration manually and separately updated.

Additionally, traditional certificate-based authentication systems are typically based on a hierarchal structure where the certification authority is located at the top of the hierarchical structure while subclusters (or subgroups) of digital certificates are located at the bottom of the hierarchical structure. For any certificate authentication used in establishing a secure communication, authentication must be conducted from the bottom to the top of the hierarchical structure. That is, authentication must be conducted along the entire chain of trust. As an example, a web browser has to be able to communicate and reach the systems at the top of the hierarchical structure along a chain of trust to authenticate that none of the parent certificates have expired. Accordingly, such authentication can be time consuming because authentication needs to involve all systems in the chain of trust. Furthermore, in any authentication operation, many or all the systems in the chain of trust need to be online and reachable. Accordingly, such authentication can be unreliable because authentication cannot be conducted if any one system in the chain of trust becomes unreachable.

SUMMARY

Example embodiments provide various techniques for scaling a group of entities for secure communication. Here, a digital certificate and a corresponding private key are generated for a particular group of entities. A certification authority assigned to this group manages membership by adding or removing entities to or from the group such that the group of entities can be scaled. In particular, the certification authority authenticates new entities requesting to join the group using the generated group digital certificate, and tracks membership by keeping a group roster of all entities that belong to the group. Upon update of the group roster with newly added entity or removed entity, the updated group roster is distributed to all entities belonging to the group such that the entities themselves can identify other entities included in the group. The entities also use security information included in the group roster for secure communication with each other.

As an example, a non-member entity may request to join a particular group of entities. If the non-member entity is to be admitted into the group, the certification authority authenticates this non-member entity by signing the non-member entity's digital certificate with a group private key. This signed, digital certificate is then added to the group roster, which is then distributed to all member entities of the group. As a result, member entities of the group can identify any newly added member by referencing the updated group roster. Furthermore, the member entities can also securely communicate with the newly added entity using the signed, digital certificate added to the group roster. When a member entity is removed from the group, any reference to this removed entity can be removed from the group roster, which is then redistributed to the other entities within the group.

Thus, with this automatic distribution of a group roster that includes cryptographic information for use in secure communications between the entities, each entity does not have to be individually and manually reconfigured for secure communication whenever group membership is updated. Furthermore, in some group setups, there is no hierarchal structure where authentication for secure communication needs to follow a hierarchal chain of trust. Instead, in such a grouping setup, each entity has the cryptographic information needed to securely communicate with other entities in the group. Therefore, the entities can securely communicate with each other without need to authenticate with any authoritative or third party entity. Examples of such an authentication system may possibly result in a more reliable communication because secure communication can be established without dependency on a third party entity.

BRIEF DESCRIPTION OF DRAWINGS

The present disclosure is illustrated by way of example and not limitation in the Figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
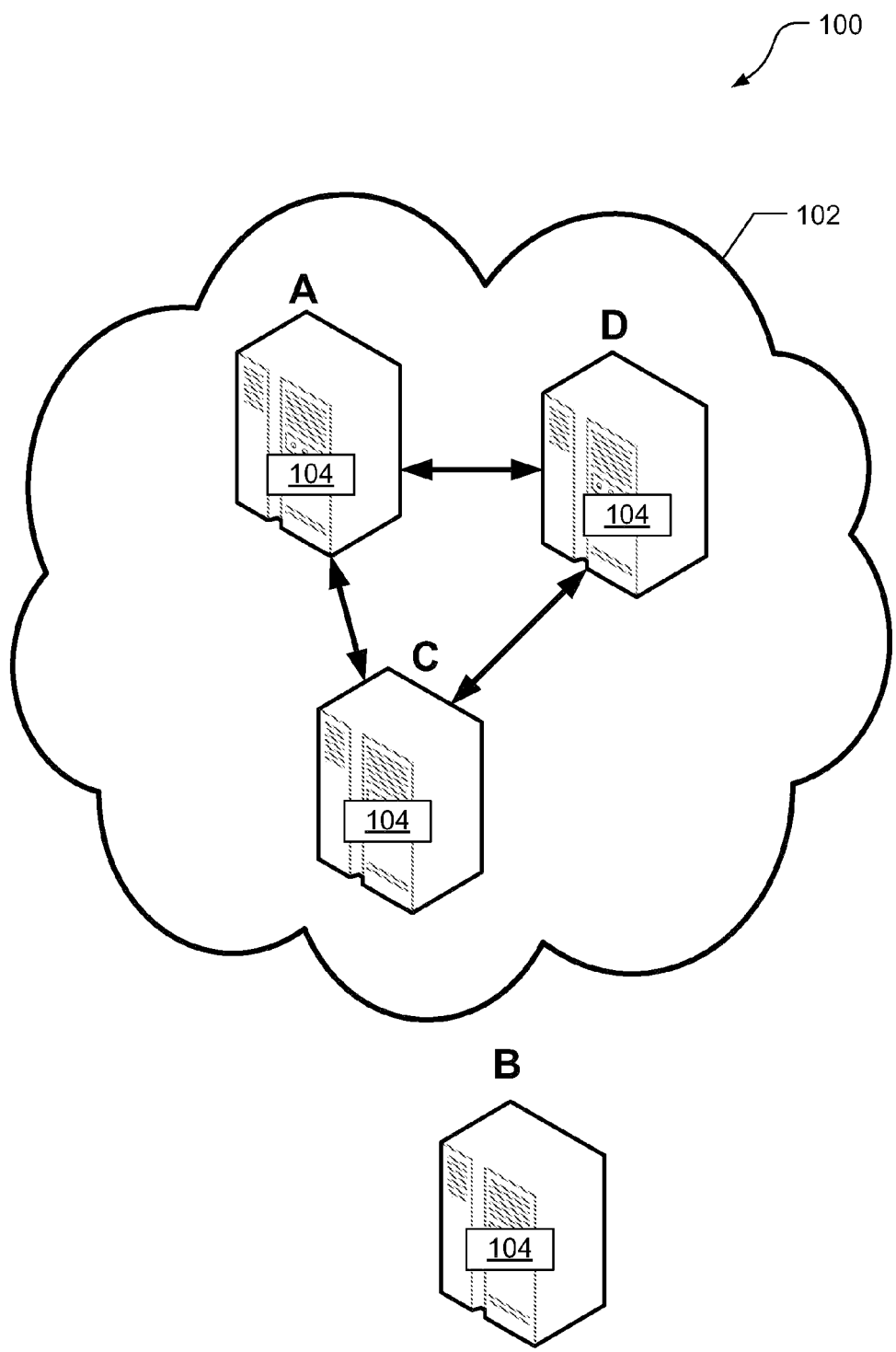
FIGS. 1 and 2 are system diagrams depicting a grouping of entities, according to embodiments of the present invention.
Figure 2:
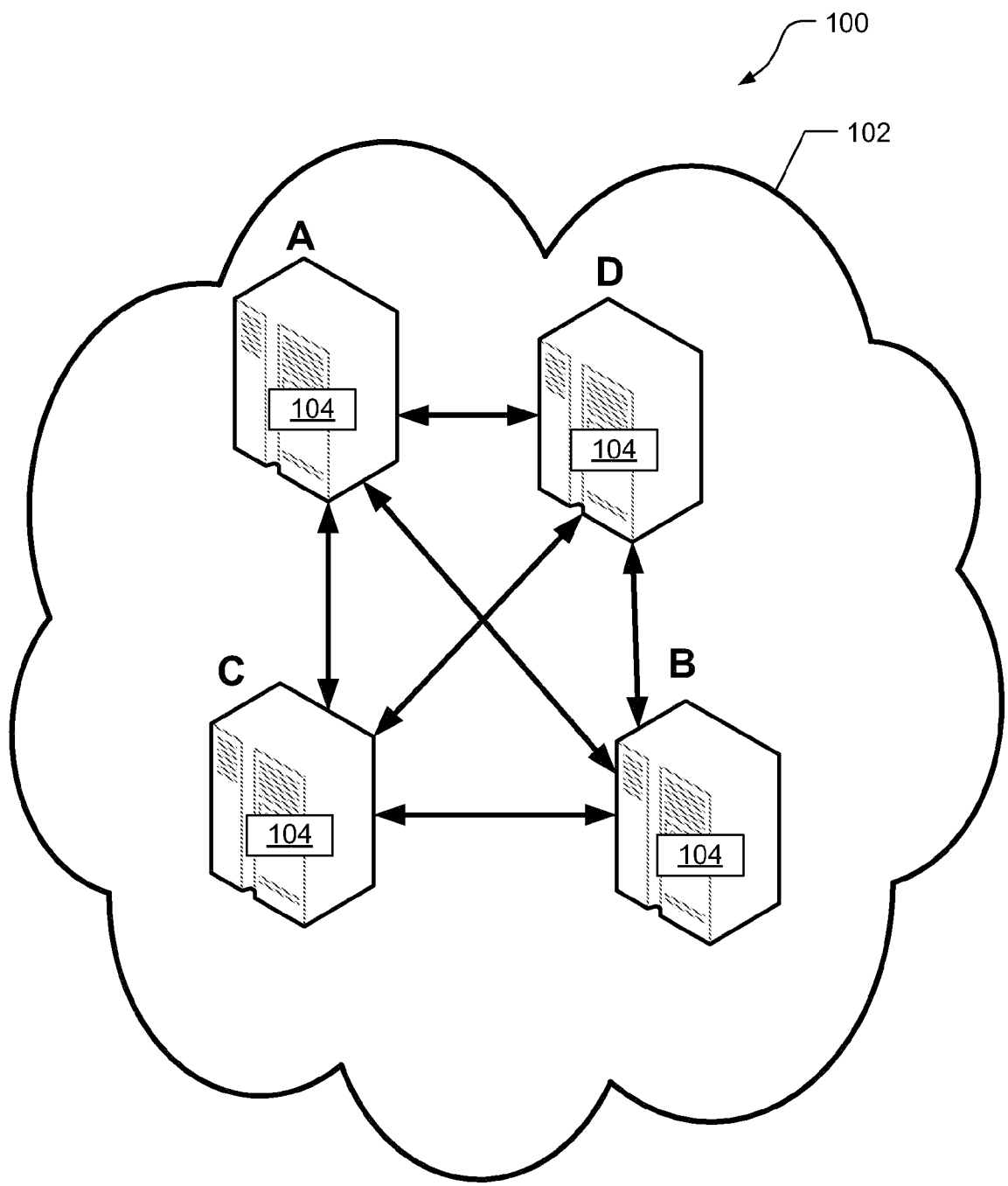

FIGS. 1 and 2 are system diagrams depicting a grouping of entities, according to embodiments of the present invention. As depicted in FIG. 1, system 100 includes entities A, B, C, and D. An "entity," as used herein, refers to a thing that is independent of other things. An example of an entity is a user account accessible by a user using a computing device. More particularly, a user has access to a user account and in the user account, the user is identified by a username or user identifier. On a stand-alone computer or a computer that is a member of a workgroup, a user account establishes the privileges assigned to each user. The user account allows a user to authenticate to system services. Another example of an entity is a computing device, such as a computer, a storage device, a personal digital assistant, a tablet computer, or a mobile phone. Yet another example of an entity is a system or cluster of computing devices. Still another example of an entity is a grouping of entities. Here, entities A, B, and C belong to or are members of a single group 102, where communications within the group 102 are secured. For example, communication from entity A to entities C and D are secured. Communication from entity C to entities A and D are also secured. The communications between entities A, C, and D are secured such that other entities not members of group 102 (e.g., entity B) do not have cryptographic information to decrypt communications transmitted within group 102.

Each entity A, B, C, or D hosts a group manager module 104 that can scale groupings of authenticated entities by admitting or removing entities from the group. For example, entity B may send a request to entity A, C, or D belonging to group 102 requesting admission into the group 102. It should be noted that such a request may be referred to as a "join request." If entity B is admitted into the group 102, then one of the group manager modules 104 associated with entity A, C, or D designated as a certification authority adds entity B along with entity B's encryption keys to a group roster, which is essentially a list of member entities of group 102, as explained in more detail below.

As depicted in FIG. 2, once entity B has been admitted into group 102, one or more group manager modules 104 distribute the group roster, which includes the encryption keys of member entities A, C, and D, to entity B. With the encryption keys, entity B can then directly communicate with all other entities A, C, and D within group 102. Vice versa, the group manager module 104 hosted at entity B also provides its encryption keys to entities A, C, and D such that these entities A, C, and D can also securely communicate with entity B.

The encryption keys (or digital certificates) are essentially used to authenticate entities A, B, C, and D. As used herein, "authentication," means that a given entity can be identified. In digital communication, essentially any message can be intercepted and altered. In asymmetric cryptography with public and private keys, an interloper trying to read secret messages transmitted between entities A, C, and D within group 102 could try to publish or use his own "false" public encryption key, claiming that his "false" key is generated by a legitimate entity A, C, or D. Each legitimate entity A, C, or D therefore needs to be able to trust how it obtained the public encryption key. Authentication is the process of an entity cryptographically proving that it has the private key that matches the given public key. In one example, as explained in detail below, authentication in the context of embodiments of the present invention relates to the propagation of the group roster, which is a trustable listing of entities included within a group and their public encryption keys.

Figure 3:
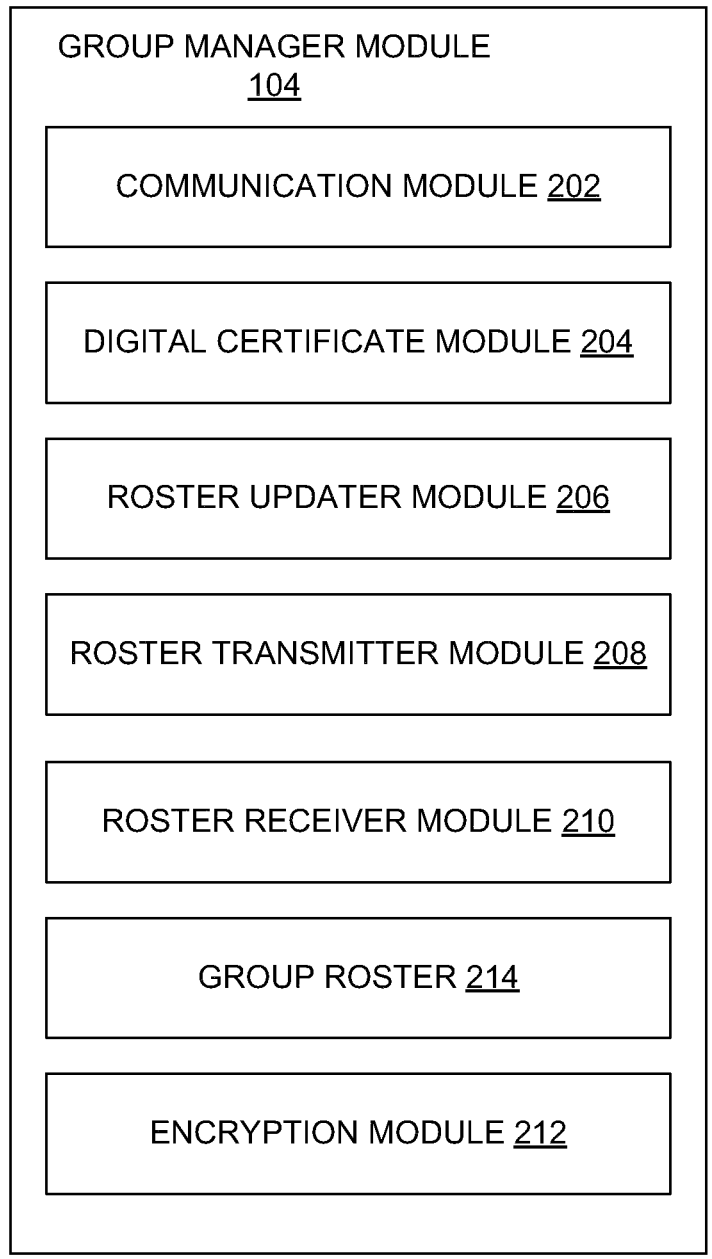
FIG. 3 is a block diagram depicting a group manager module, in accordance with an embodiment of the present invention.

FIG. 3 is a block diagram depicting a group manager module 104, in accordance with an embodiment of the present invention. It should be appreciated that the group manager module 104 may be deployed in the form of, for example, a personal computer, a laptop computer, a server computer, a tablet personal computer, a smart phone, or other computing devices or hardware. In one embodiment, the group manager module 104 may be included in the system 100 depicted in FIGS. 1 and 2. In various embodiments, the group manager module 104 may be used to implement computer programs, logic, applications, methods, processes, or software to manage and secure communications within a group of entities, as described in more detail below.

As depicted in FIG. 3, the group manager module 104 includes a communication module 202, a digital certificate module 204, a roster updater module 206, a roster transmitter module 208, a roster receiver module 210, a group roster 214, and an encryption module 212. The communication module 202 is configured to transmit and receive messages or other data to and from other computing devices. As an example, the communication module 202 can receive request messages from other entities. The digital certificate module 204 is configured to generate, create, or access digital certificates and other encryption keys. As used herein, the "access" of digital certificate or other data can refer to locating and reading the digital certificate from a storage medium, such as random access memory or non-volatile memory. It should be appreciated that a digital certificate is an electronic credential that binds the identity of a certificate owner to a pair (public and private) of cryptographic keys that can be used to encrypt and sign information digitally. The electronic credential assures that the cryptographic keys actually belong to the specified entity. Each digital certificate may include information such as an owner's public key, owner's name or alias, expiration date of the certificate, serial number of the certificate, name of the organization that issued the certificate, digital signature of the organization that issued the certificate, and other information. Accordingly, any entity can create or generate a digital certificate by accessing such information, which may be provided by a user interfacing with the digital certificate module 204, and including it in the digital certificate.

The encryption module 212 is configured to encrypt and decrypt messages received from or transmitted to other entities using, for example, digital certificates and other encryption keys generated or provided by the digital certificate module 204. Also included in the group manager module 104 are a set of modules (e.g., the roster updater module 206, the roster transmitter module 208, and the roster receiver module 210) that are configured to access and manage the group roster 214. As used herein, a "group roster" refers to a list of entities that have been admitted into a group. Essentially, the group manager module 104 references the group roster 214 to identify the different entities that belong to a particular group. Additionally, the group roster 214 also includes cryptographic information, and the group manager module 104 can use this encryption information to securely communicate with other entities within a group.

It should be noted that in other embodiments, the group manager module 104 may include fewer or more modules apart from those shown in FIG. 3. For example, in an alternate embodiment, the roster updater module 206, the roster transmitter module 208, and the roster receiver module 210 may be integrated in one module. The modules 202, 204, 206, 208, 210, 212, and 214 may be in the form of software that is processed by a processor. In another example, as explained in more detail below, the modules 202, 204, 206, 208, 210, 212, and 214 may be in the form of firmware that is processed by application specific integrated circuits (ASIC), which may be integrated into a circuit board. Alternatively, the modules 202, 204, 206, 208, 210, 212, and 214 may be in the form of one or more logic blocks included in a programmable logic device (for example, a field programmable gate array). The described modules 202, 204, 206, 208, 210, 212, and 214 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
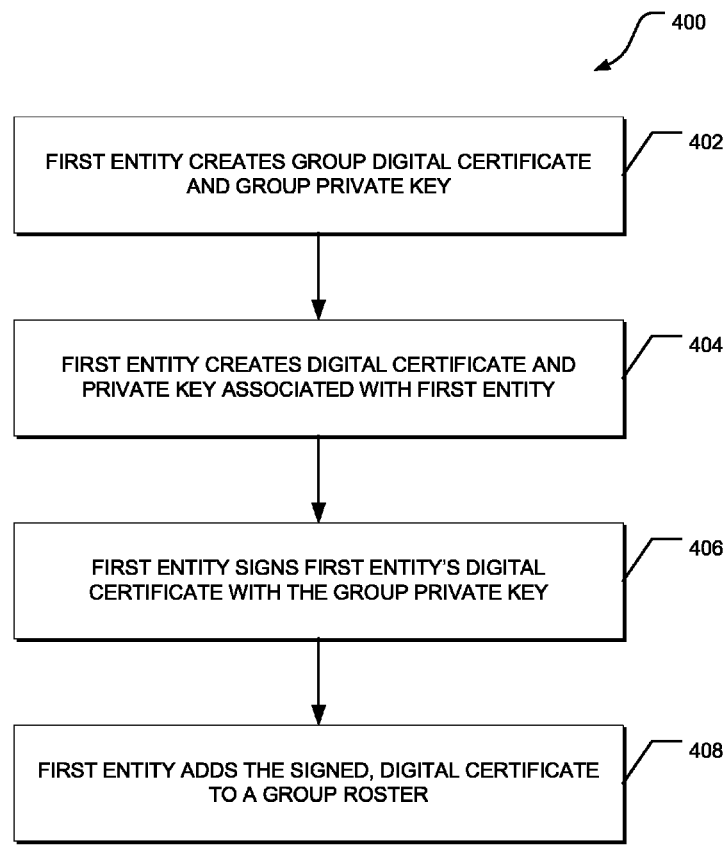
FIG. 4 is a flow diagram depicting a general overview of a method, in accordance with an embodiment, for a setup of encryption keys for a group of entities.

FIG. 4 is a flow diagram depicting a general overview of a method 400, in accordance with an embodiment, for generating encryption keys for a group of entities. In example embodiments, the method 400 may be implemented by the group manager module 104 of FIG. 3. In FIG. 4, one of a number of entities belonging to a group is designated as a certification authority. A certification authority, as used herein, refers to an entity that signs digital certificates for use by other entities within a group. Here, the entity that has been designated as the certification authority is referred to as a "first" entity. At 402, this first entity creates a group digital certificate and a corresponding group private key. As explained in more detail below, the group digital certificate is used to authenticate the certificates of other entities that are to be admitted into the group. It should be appreciated that a variety of well-known cryptography techniques can be used to create a digital certificate and a corresponding private key.

Additionally, at 404, the first entity creates a digital certificate and a corresponding private key that are associated with itself. The group digital certificate and the group private key are assigned to the group as a whole while the first entity's digital certificate and private key are used by the first entity to communicate with other entities in the group.

As the designated certification authority, the first entity signs its own digital certificate with the group private key at 406. Here, signing refers to the process of using an encrypted digital signature as an annotation to a variety of data, such as using an encrypted digital signature as an annotation to a cryptographic key or a digital certificate. As an example, a signer (e.g., certification authority) computes a 50-100 byte sized digital signature of given data, such as a digital certificate or a cryptographic key. The signer then encrypts the digital signature with its private key (e.g., a group private key). The given data is then annotated with this encrypted signature, and both can be transmitted together.

After the first entity's digital certificate has been signed using the group private key, the first entity adds the signed, digital certificate to a group roster at 408. In one embodiment, the group roster includes the signed, digital certificates of many or all entities included within a group. Additionally, the group roster may also include the entities' identifiers, each of which is a value (numerical or textual) that uniquely identifies an entity or a group of entities. Examples of identifiers include a user name, an organization name, Media Access Control (MAC) address, processor serial number, and other identifiers. As an example, a group manager module can reference this group roster to identify all entities that have been admitted to the group. In another example, identifier can be created to identify subgroups of entities that belong to a parent group. Accordingly, the addition of the signed, digital certificate indicates to other entities that the first entity has been admitted into the group.

Figure 5A:
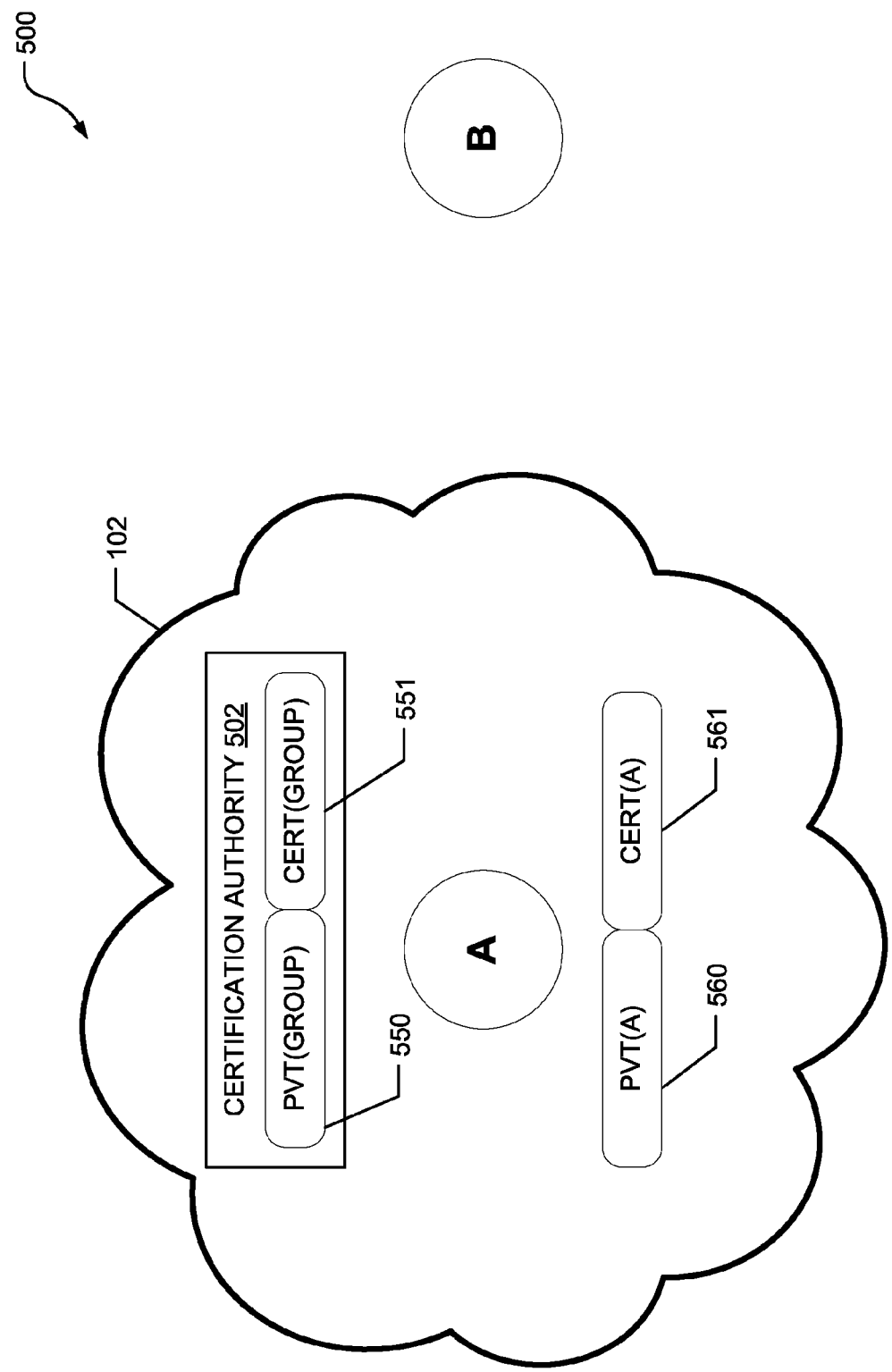
FIGS. 5A-5C are diagrams depicting the establishment and use of group encryption keys, in accordance with an embodiment of the present invention.
Figure 5B:
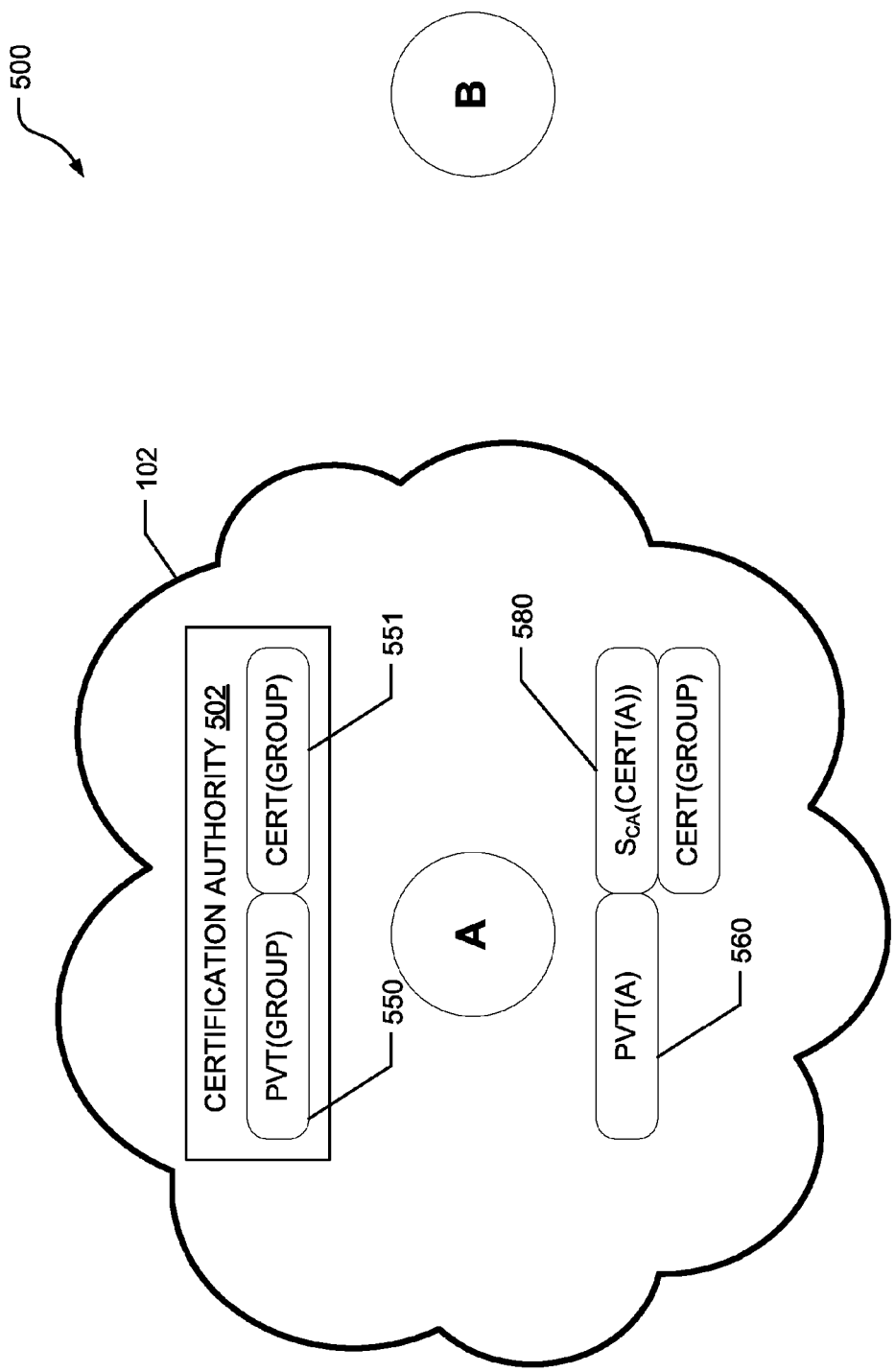
Figure 5C:
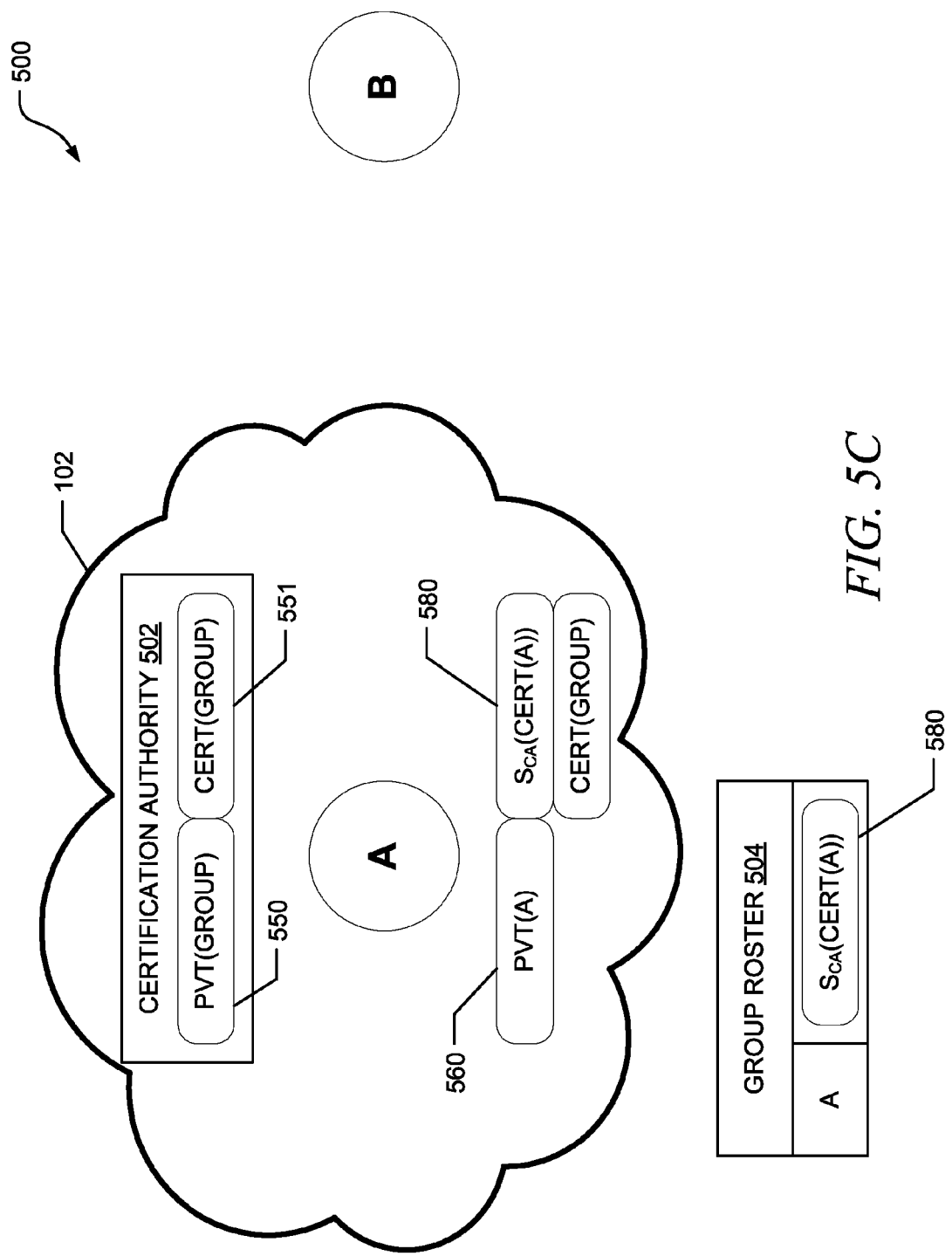

FIGS. 5A-5C are diagrams depicting the establishment and use of group encryption keys, in accordance with an embodiment of the present invention. As depicted in FIG. 5A, the system 500 includes entity A and entity B. Entity A belongs to group 102 while entity B has not been admitted into the group 102. Entity A has been designated by, for example, an administrator as a certification authority 502 for the group 102. Accordingly, a group manager module associated with entity A (not shown) creates a group digital certificate 551 and a corresponding group private key 550. At the same time, entity A also creates a digital certificate 561 and a corresponding private key 560 for itself for secure communication with other entities that have been admitted into the group 102.

Given that entity A belongs to group 102, the group manager module associated with entity A signs entity A's digital certificate 561 with the group private key 550. As depicted in FIG. 5B, the signing of the digital certificate 561 with the group digital certificate 551 creates a signed, digital certificate 580. The signing of the digital certificate 561 with the group private key 550 indicates that entity A has been admitted into the group 102. In other words, the certification authority only signs entity A's digital certificate with the group digital key 550 if entity A has been admitted into the group 102. An administrator or other user makes the decision to admit or remove an entity to or from the group 102.

As depicted in FIG. 5C, after the generation of the signed, digital certificate 580, the group manager module then adds the signed, digital certificate 580 to a group roster 504. Additionally, the group manager module accesses an identifier used to identify entity A and adds this identifier to the group roster 504. As depicted, the identifier "A" included in the group roster 504 is associated with the signed, digital certificate 580. By adding entity A's identifier to the group roster 504, other entities within the group 102 can identify that entity A has been admitted into the group 102.

Figure 6:
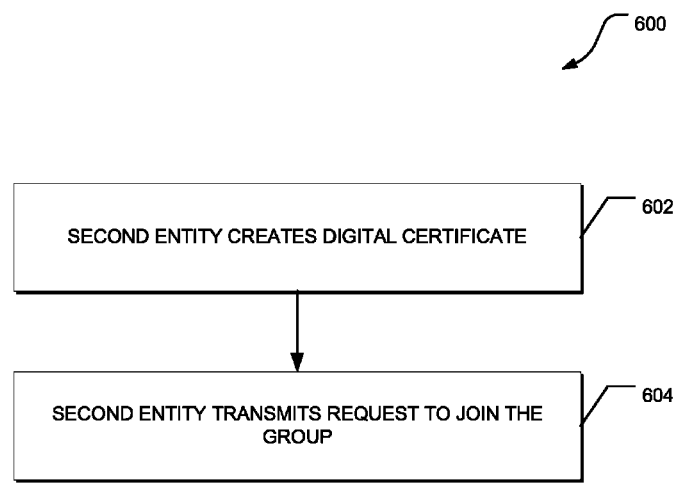
FIG. 6 is a flow diagram depicting a general overview of a method, in accordance with an embodiment, for a non-member entity to join a group.

FIG. 6 is a flow diagram depicting a general overview of a method 600, in accordance with an embodiment, for a non-member entity to join a group from the perspective of the non-member entity. In an example embodiment, the method 600 may be implemented by the group manager module 104 of FIG. 3. Referring to FIG. 6, a different entity that does not belong to a group may want to join a group. As used herein, this different entity is referred to as a "second" entity. To securely communicate with other entities in the group, this second entity initially creates a digital certificate and a corresponding private key at 602. Thereafter, the second entity at 604 transmits a request to an entity of a group to join that group. It should be noted that the second entity has the address of at least one entity in the group to transmit its request. In one example, the address to reach an entity in the group (e.g., network address or domain name) can be exchanged with the second entity out-of-band, by action of administrator or other users, before transmission of the request. For example, a user associated with an entity of the group can provide the address to the second entity by way of, for example, e-mail communication, a physical media that stores the second entity's digital certificate (e.g., Universal Serial Bus (USB) flash drive), or other out-of-band communication.

Figure 7:
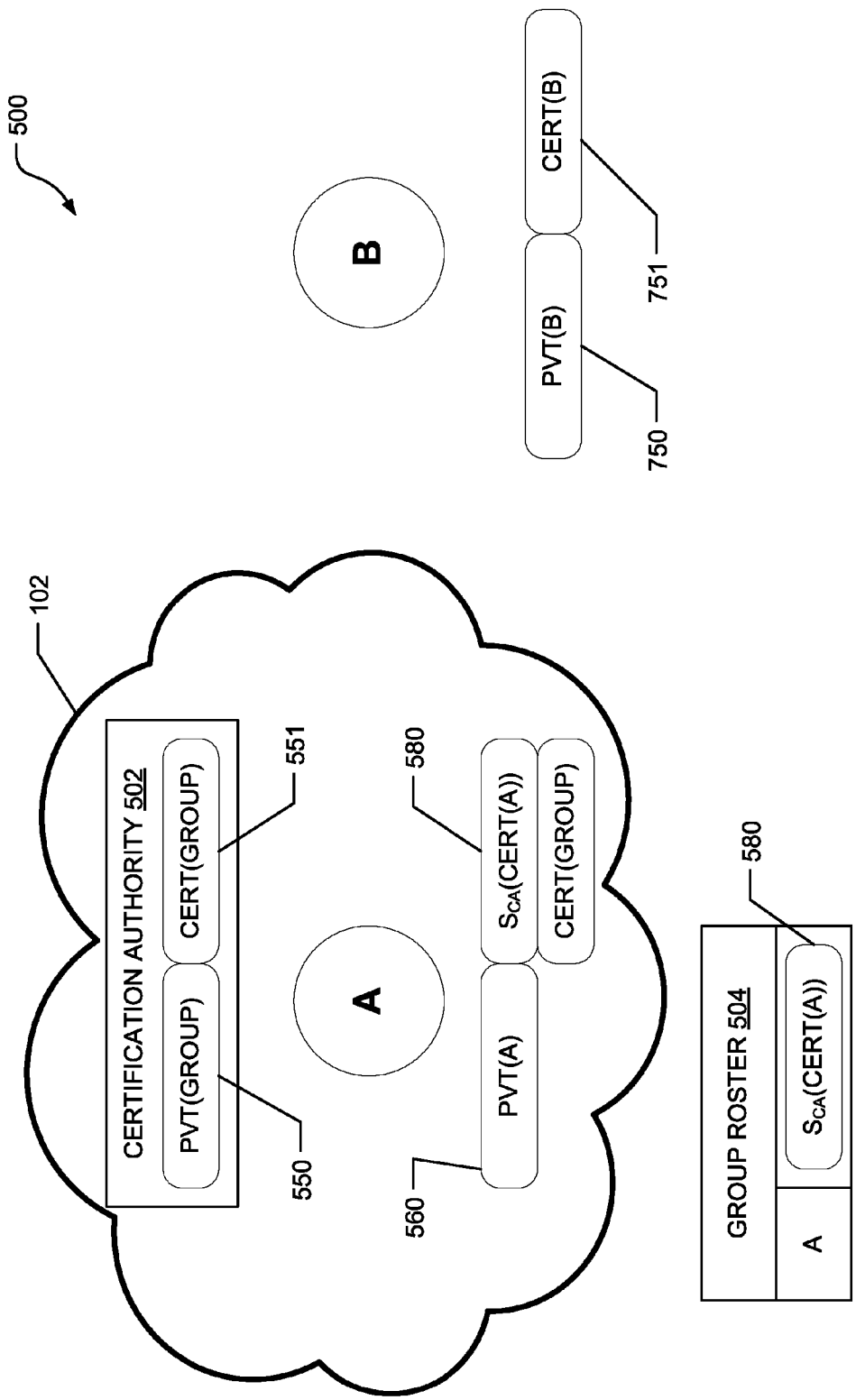
FIG. 7 is a diagram depicting the addition of a non-member entity into a group, in accordance with an embodiment of the present invention.

FIG. 7 is a diagram depicting the addition of a non-member entity into a group from the perspective of the non-member entity, in accordance with an embodiment of the present invention. The system 500 depicted in FIG. 7 is the same system depicted in FIGS. 5A-5C where the system 500 includes entity A that, as explained above, has been admitted into group 102 and is designated as the certification authority 502. In this example, entity B wants to join group 102. As a result, entity B creates a digital certificate 751 and a corresponding private key 750. Entity B then transmits a request to entity A to join the group 102.

Figure 8:
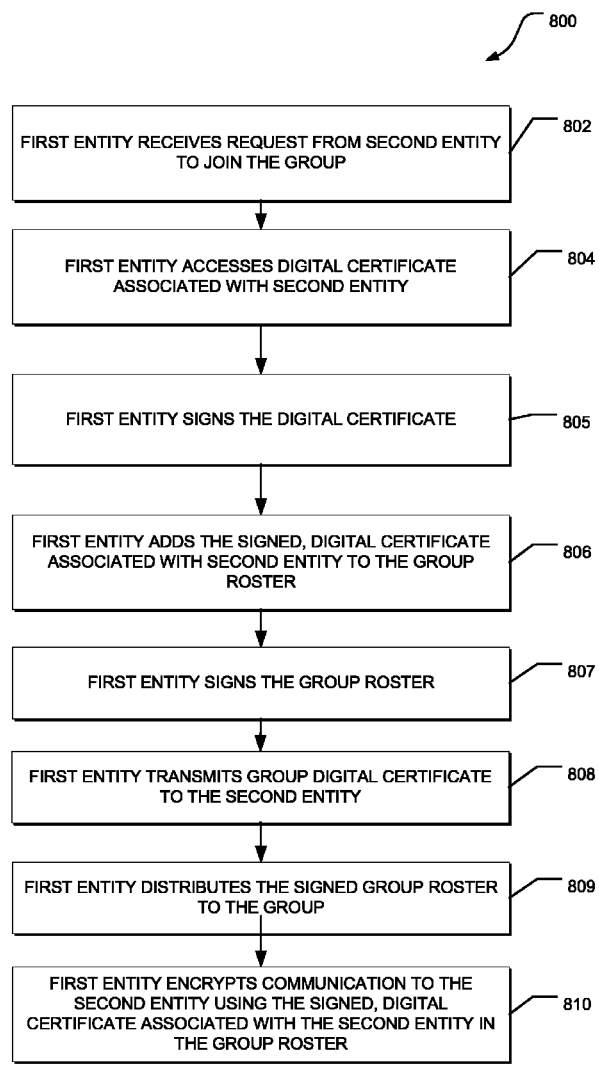
FIG. 8 is a flow diagram depicting a general overview of a method, in accordance with an embodiment, for adding a non-member entity into a group.

FIG. 8 is a flow diagram depicting a general overview of a method 800, in accordance with an embodiment, for adding a non-member entity into a group from the perspective of a member entity. In this example embodiment, the method 800 can be implemented by the group manager module of FIG. 3. As depicted in FIG. 8, a "first" member entity receives a request from a "second" non-member entity at 802 to join a group with which the first entity is a member. The first entity then locates and accesses a digital certificate associated with the second entity at 804 and signs the accessed digital certificate at 805 with a group certificate.

It should be noted that before the second entity has been admitted into the group, the second entity's digital certificate, in one embodiment, can be provided to the first entity out-of-band. In other words, the second entity's digital certificate is not directly transmitted to the first entity through the secure communication channel used within the group because, in part, the second entity does not have the cryptographic information to securely communicate with other entities in the group. Instead, a user associated with the second entity can provide the second entity's digital certificate to the first entity by way of, for example, e-mail communication, a physical media that stores the second entity's digital certificate (e.g., Universal Serial Bus (USB) flash drive), or other out-of-band communication. In an alternate embodiment, the second entity's digital certificate can also be transmitted to the first entity using a variety of different protocols, such as certificate-exchange protocols (e.g., Secure Sockets Layer (SSL) and Transport Layer Security (TLS)). Similarly, the group digital certificate can be provided from the first entity to the second entity out-of-band.

Upon receipt of the second entity's digital certificate, an administrator or other user associated with the first entity may decide to admit the second entity. If admitted, the second entity's digital certificate is signed with the group private key, as discussed above, to provide the signed, digital certificate for access at 804.

The first entity then adds the signed, digital certificate along with an identifier identifying the second entity to a group roster at 806 and, in one embodiment, then signs the group roster with the group private key at 807. The first entity may transmit the group digital certificate to the second entity at 808. The first entity then distributes or transmits this updated, signed group roster to the group at 809. In particular, the first entity accesses the group roster to identify all the entities that are associated with the group and then transmits a copy of the updated, signed group roster to the identified entities. As described above, the addition of the second entity's signed, digital certificate to the group roster indicates to the other entities in the group that the second entity has been admitted into the group. The signing of the new group roster with the group private key can be an indication that the second entity has been admitted into the group. Additionally, the distribution of the group roster transmits cryptographic information to other entities in the group such that these other entities can securely communicate with the newly added second entity. Therefore, as depicted at 810, the first entity (as well as other entities in the group) can encrypt communication to the second entity using the signed, digital certificate associated with the second entity included in the group roster.

Figure 9A:
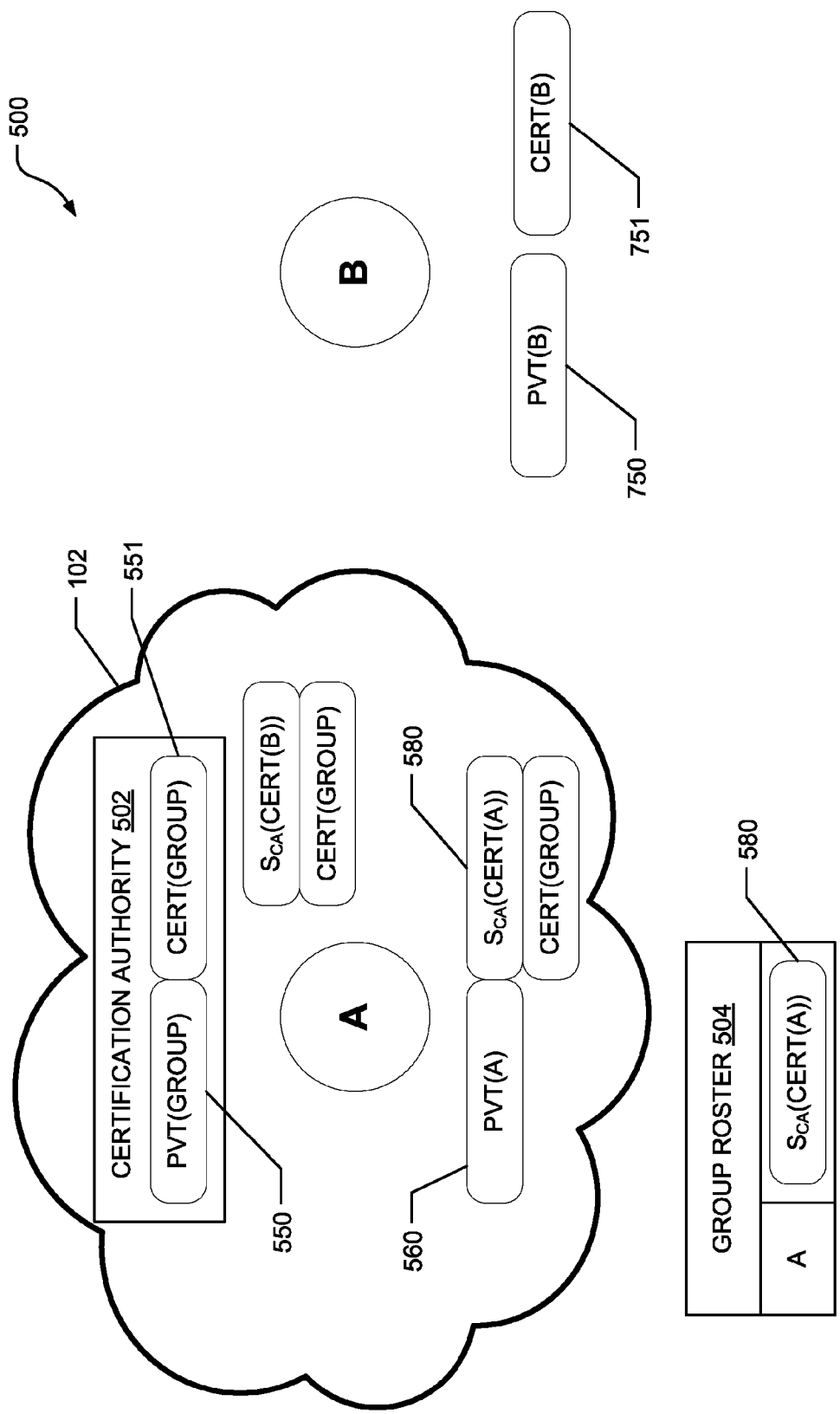
FIGS. 9A-9B are diagrams illustrating the addition of an entity into a group, in accordance with an embodiment of the present invention.
Figure 9B:
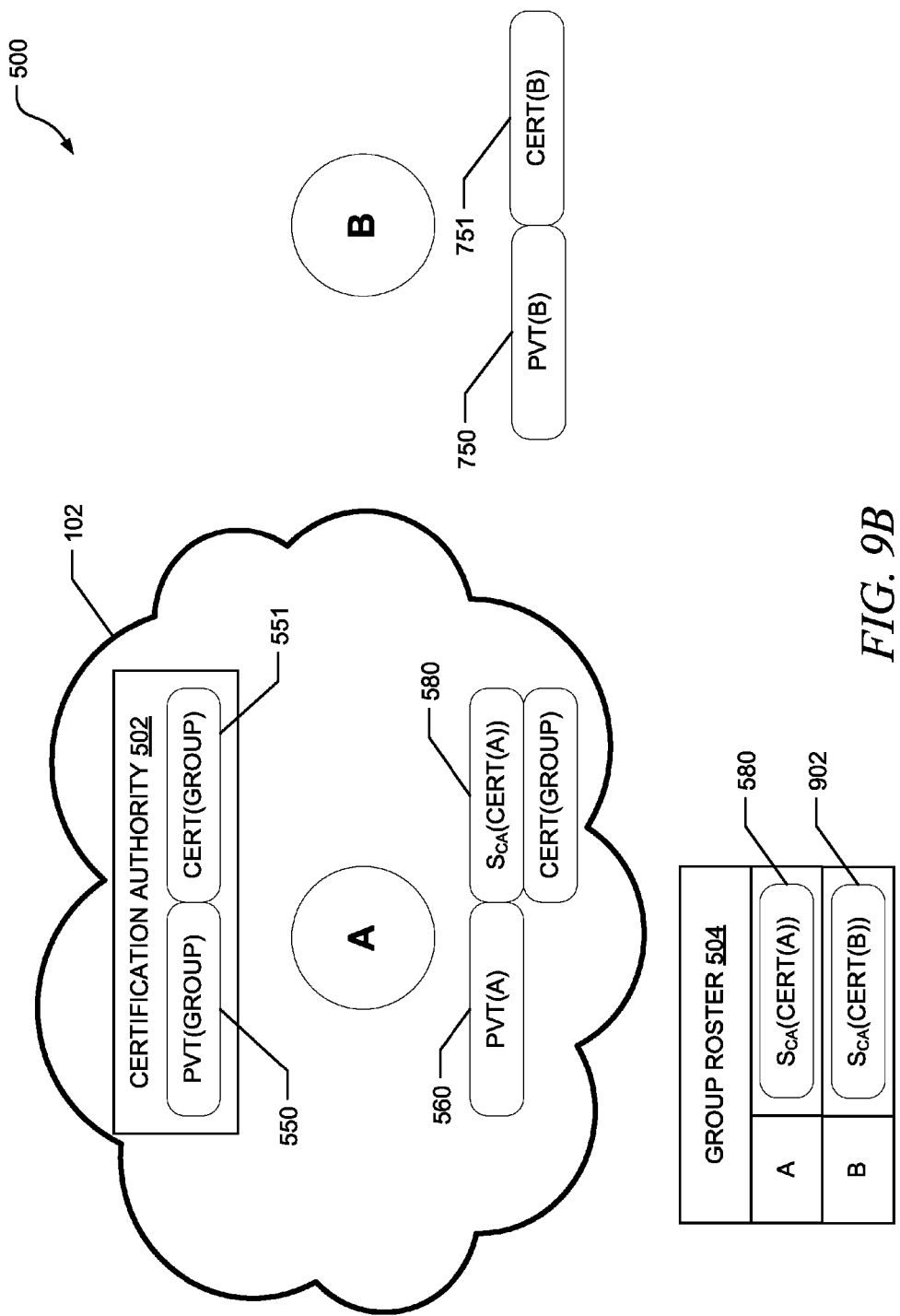

FIGS. 9A-9B are diagrams illustrating the addition of an entity into a group, in accordance with an embodiment of the present invention. As depicted in FIG. 9A, the system 500 is the same system depicted in FIGS. 5A-5C and 7 where the system 500 includes entity A that, as explained above, is a member of group 102 and is designated as a certification authority 502. In this example, entity B wants to join group 102 and its digital certificate has been provided to entity A out-of-band. For example, a user may store entity B's digital certificate in a USB drive and provide the USB drive to a user or administrator of entity A. Upon admission, entity B's digital certificate 751 is signed with the group private key 550 to create or generate a signed, digital certificate 902.

Referring now to FIG. 9B, entity A then accesses this signed, digital certificate 902 and adds it to the group roster 504. Entity A also adds entity B's identifier to the group roster 504, and this identifier is associated with the signed, digital certificate 902 in the group roster 504 to indicate that the signed, digital certificate 902 is associated with entity B. Entity A then signs the group roster 504 with the group private key 550 and distributes this signed group roster 504 to entities belonging to group 102, which now includes entity B.

Figure 10:
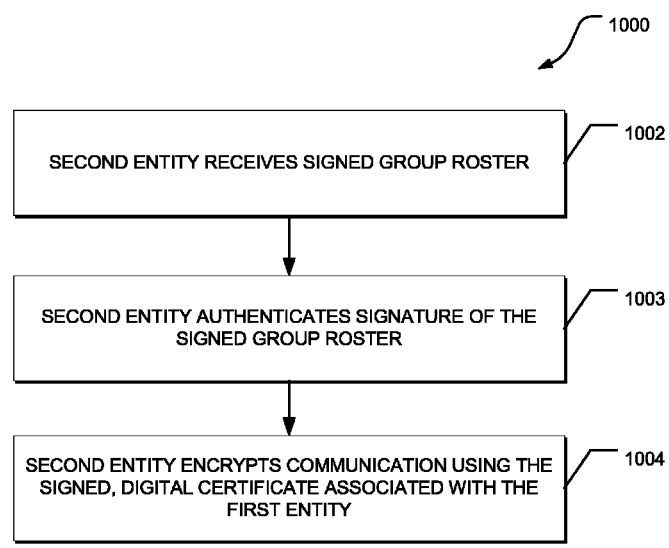
FIG. 10 is a flow diagram depicting a general overview of a method, in accordance with an embodiment, from the perspective of a second entity after having been admitted into a group.

FIG. 10 is a flow diagram depicting a general overview of a method 1000, in accordance with an embodiment, from the perspective of a second entity after having been admitted into a group. In example embodiments, the method 400 may be implemented by the group manager module 104 of FIG. 3. In FIG. 10, if the "second" entity has been admitted into a group, the second entity receives a signed group roster associated with the group at 1002 and verifies the signature of the signed group roster at 1003. As discussed above, the group roster was previous signed with the group private key and therefore, verification can involve the second entity identifying that the signature of the group roster cryptographically matches the group digital certificate.

This group roster includes the signed, digital certificates of all entities that are members of the group. Accordingly, the second entity can use the signed, digital certificates to securely communicate with other member entities. For example, as depicted at 1004, the second entity can encrypt communication to a "first" entity that is a member of the group using the first entity's signed, digital certificate included in the group roster.

Figure 11:
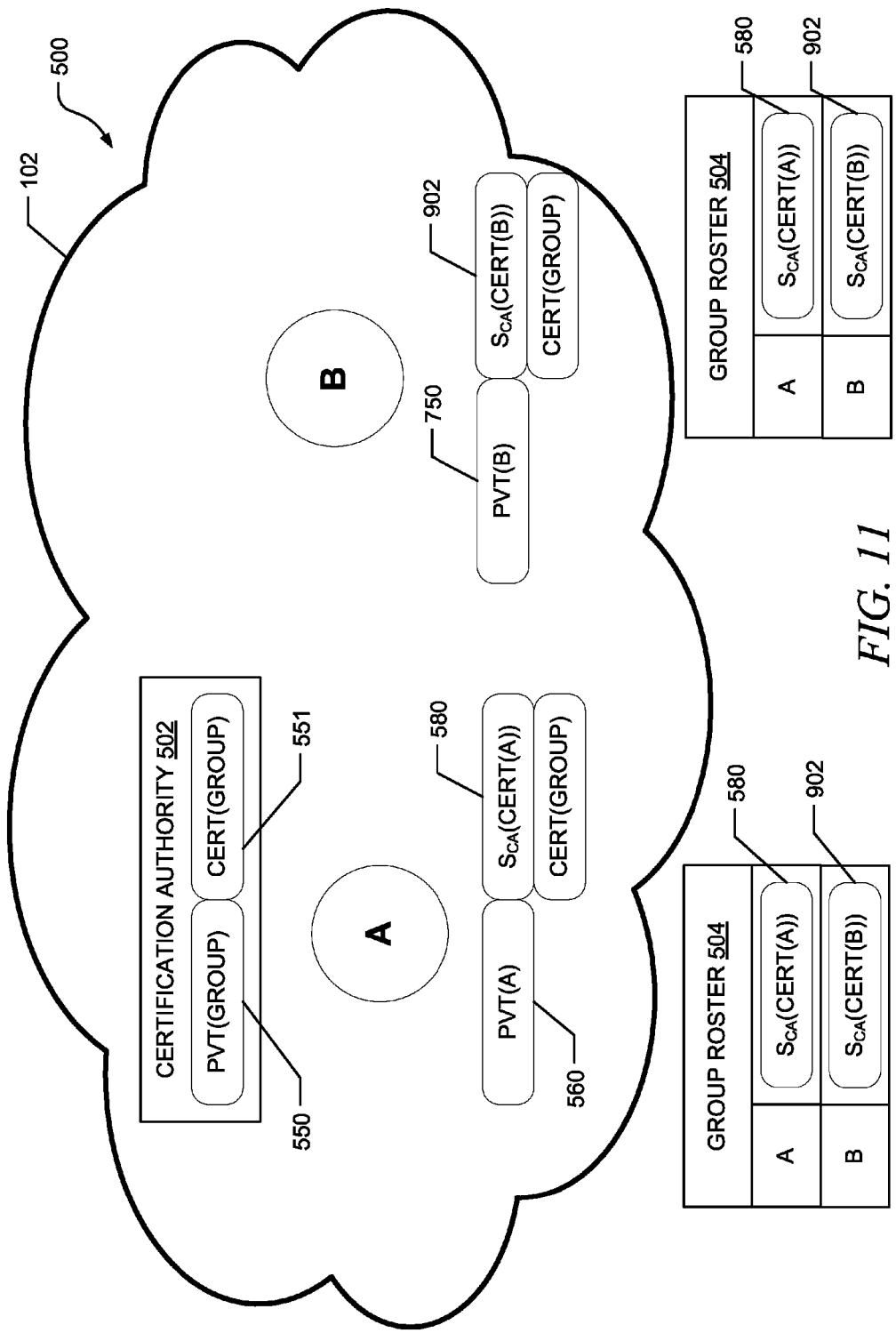
FIG. 11 is a diagram depicting secure communications between member entities, in accordance with an example embodiment of the present invention.

FIG. 11 is a diagram depicting secure communications between member entities, in accordance with an example embodiment of the present invention. As depicted in FIG. 11, the system 500 is the same system depicted in FIGS. 5A-5C, 7, and 9A-9B where the system 500 includes entity A that, as explained above, is a member of group 102 and is designated as a certification authority 502. As discussed previously, entity B has been admitted into the group 102 and therefore, entity A has previously added entity B's signed, digital certificate 902 to the signed group roster 504 and has distributed this signed group roster 504 to all member entities of group 102, including entity B.

Upon receipt of the group roster 504, entity B verifies the signature on the signed group roster 504. With entity B being a member of group 102, entity B therefore has a copy of the signed group roster 504, which includes the signed, digital certificates of all entities included in the group 102, including the signed, digital certificate 580 associated with entity A. The signed, digital certificates 580 and 902 included in the signed group roster 504 can be used for secure communications between member entities A and B. For example, entity B can use entity A's signed, digital certificate 580 to encrypt messages to entity A. Upon receipt of the encrypted message from entity B, entity A can use its corresponding private key 560 to decrypt the encrypted message, which was originally generated using entity A's signed, digital certificate 580. Vice versa, entity A can use entity B's signed, digital certificate 902 to encrypt messages to entity B. Upon receipt of the encrypted message from entity A, entity B can use its corresponding private key 750 to decrypt the encrypted message, which was originally generated using entity B's signed, digital certificate 902.

With this automatic distribution of the signed group roster 504 that includes cryptographic information for use in secure communications between member entities A and B, each entity A or B does not have to be individually and manually reconfigured for secure communication whenever group membership is updated. Furthermore, in some group setups, there is no hierarchal structure where authentication for secure communication needs to follow a hierarchal chain of trust. Instead, in such a group setup, each entity A or B has the cryptographic information needed to securely communicate with other entities in the group. Therefore, entities A and B can securely communicate with each other without need to verify with any authoritative or third party entity, such as another entity C (not shown). Examples of such an authentication system may possibly result in a more reliable communication because secure communication can be established without dependency on a third party entity.

Figure 12:
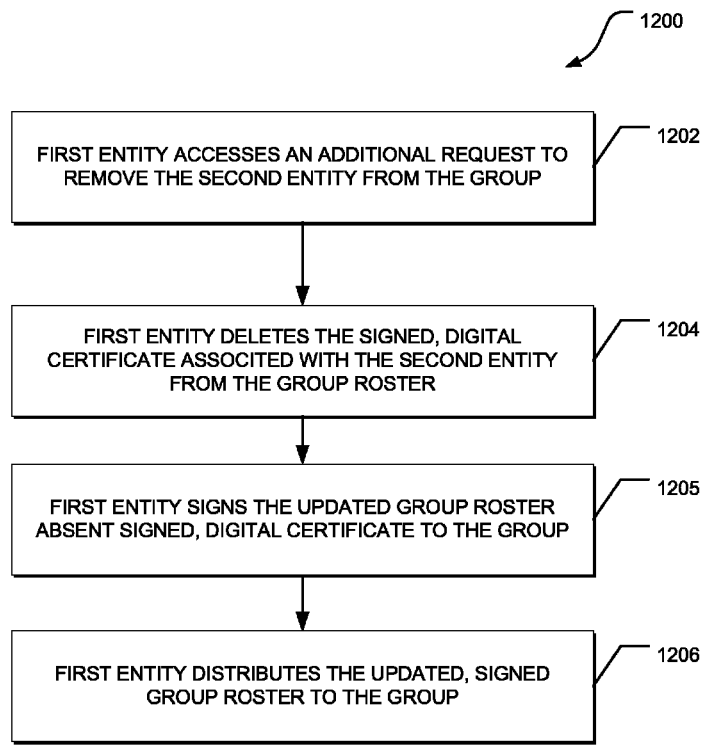
FIG. 12 is a flow diagram depicting a general overview of a method, in accordance with an embodiment of the present invention, for removing a member entity from a group.

FIG. 12 is a flow diagram depicting a general overview of a method 1200, in accordance with an embodiment of the present invention, for removing a member entity from a group. In some example embodiments, the method 1200 may be implemented by the group manager module 104 of FIG. 3. If an entity is to be removed from a group, the group manager module updates the group roster to remove any reference of the removed entity, and then redistributes this updated group roster to all member entities included in the group. In one embodiment, as depicted in FIG. 12, a "first" entity accesses a request at 1202 to remove a "second" entity from the group. The second entity can itself transmit this request or an administrator of the group can initiate the request. Upon receipt of the request, the first entity at 1204 deletes the signed, digital certificate and an identifier associated with the second entity from the group roster and, at 1206, the first entity signs the updated group roster with the group private key at 1205. The first entity then distributes the updated, signed group roster at 1206 to the group.

With the receipt of the updated group roster, member entities can reference the updated group roster to identify that the second entity is no longer a member of the group. Plus, the member entities cannot securely communicate with the removed entity because, in part, the cryptographic information required to securely communicate with the removed entity is no longer available in the updated group roster.

Figure 13:
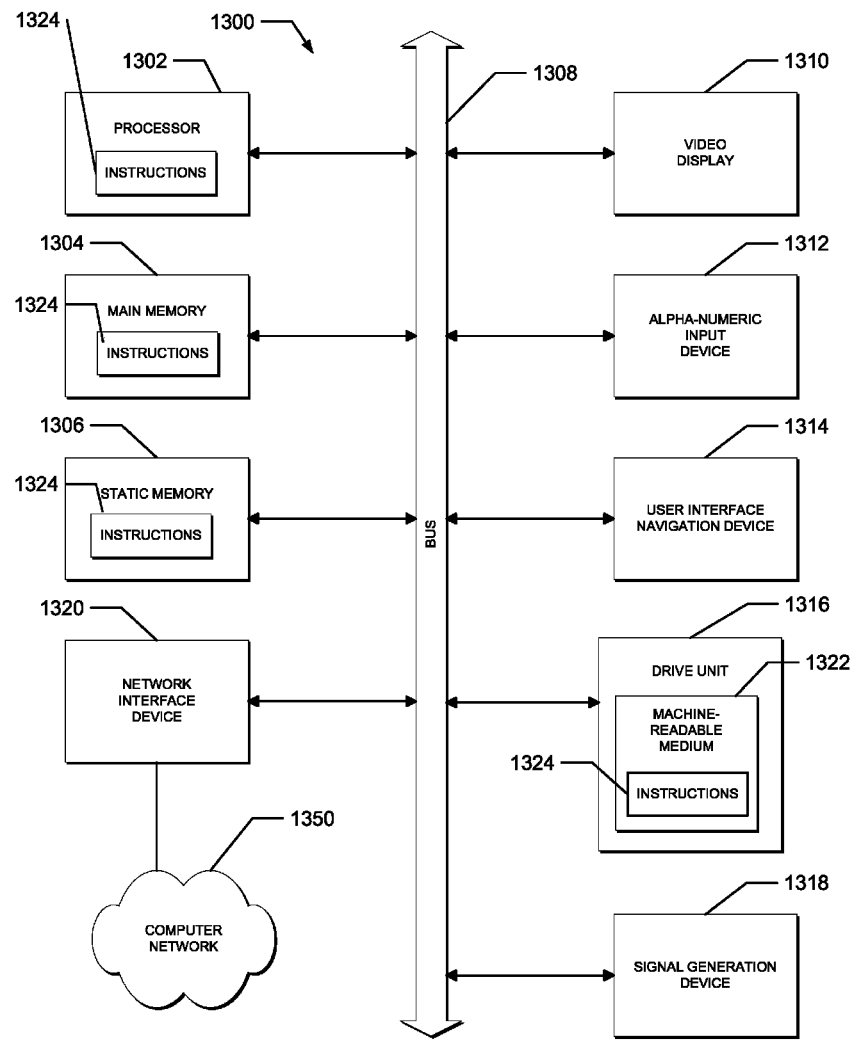
FIG. 13 depicts a hardware block diagram of a machine in the example form of a processing system within which may be executed a set of instructions for causing the machine to perform any one or more of the methodologies discussed herein.

FIG. 13 depicts a hardware block diagram of a machine in the example form of a processing system 1300 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1300 includes a processor 1302 (e.g., a central processing unit (CPU), a graphics processing unit (GPU) or both), a main memory 1304 (e.g., random access memory), and static memory 1306 (e.g., static random-access memory), which communicate with each other via bus 1308. The processing system 1300 may further include video display unit 1310 (e.g., a plasma display, a liquid crystal display (LCD) or a cathode ray tube (CRT)). The processing system 1300 also includes an alphanumeric input device 1312 (e.g., a keyboard), a user interface (UI) navigation device 1314 (e.g., a mouse), a disk drive unit 1316, a signal generation device 1318 (e.g., a speaker), and a network interface device 1320.

The disk drive unit 1316 (a type of non-volatile memory storage) includes a machine-readable medium 1322 on which is stored one or more sets of data structures and instructions 1324 (e.g., software) embodying or utilized by any one or more of the methodologies or functions described herein. The data structures and instructions 1324 may also reside, completely or at least partially, within the main memory 1304 and/or within the processor 1302 during execution thereof by processing system 1300, with the main memory 1304 and processor 1302 also constituting machine-readable, tangible media.

The data structures and instructions 1324 may further be transmitted or received over a computer network 1350 via network interface device 1320 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In example embodiments, one or more computer systems (e.g., the processing system 1300) or one or more hardware modules of a computer system (e.g., a processor 1302 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1302 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1302 configured using software, the general-purpose processor 1302 may be configured as respective different hardware modules at different times. Software may accordingly configure a processor 1302, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1302 that are temporarily configured (e.g., by software) or permanently configured to perform the relevant operations. Whether temporarily or permanently configured, such processors 1302 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1302 or processor-implemented modules. The performance of certain of the operations may be distributed among the one or more processors 1302, not only residing within a single machine, but deployed across a number of machines. In some example embodiments, the processors 1302 may be located in a single location (e.g., within a home environment, an office environment or as a server farm), while in other embodiments the processors 1302 may be distributed across a number of locations.

While the embodiment(s) is (are) described with reference to various implementations and exploitations, it will be understood that these embodiments are illustrative and that the scope of the embodiment(s) is not limited to them. In general, techniques for scaling groups of authenticated entities may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A computer-implemented method of securing communications within a group of entities, the method comprising:
designating a first entity in the group of entities as a certification authority to sign digital certificates for use by the entities within the group, wherein the first entity:
creates a group digital certificate and a group private key;
creates a digital certificate and private key for the first entity;
signs the digital certificate with the group private key;
adds the signed digital certificate to a group roster for the group;
adds an identifier for the first entity to the group roster, the identifier being associated with the signed digital certificate for the first entity;
adds one or more other entities in the group of entities to the group roster;
distributes the group roster with the signed digital certificates associated with the first entity and each of the one or more entities to the group; and
after distributing the group roster, enables communications to be exchanged between the entities within the group, wherein enabling communications to be exchanged includes encrypting a communication that is to be transmitted from one entity to a second entity using the signed digital certificate associated with the second entity included in the group roster.

2. The method of claim 1, wherein adding one or more other entities in the group of entities to the group roster includes (i) receiving a digital certificate associated with the other entity, (ii) signing the received digital certificate associated with the other entity with the group private key, (iii) adding the signed digital certificate to a group roster, the group roster including a plurality of signed digital certificates associated with the entities of the group, and (iv) adding an identifier associated with the other entity to the group roster, the identifier being associated with the signed digital certificate associated with the other entity in the group roster.

3. The method of claim 1, wherein the one or more other entities verify a signature of the group roster by identifying that the signature cryptographically matches the group digital certificate.

4. The method of claim 1, wherein the group digital certificate is used to authenticate certificates of the one or more other entities that are to be admitted into the group.

5. The method of claim 1, wherein signing the digital certificate includes the certification authority computing a 50-100 byte sized digital signature of the digital certificate, encrypting the digital signature with the group private key, and annotating the digital certificate with the encrypted signature.

6. The method of claim 1, wherein entities include user accounts accessible by a user using a computing device, a computing device, a system, and a cluster of computing devices.

7. The method of claim 1, wherein the group roster includes the signed digital certificates for all entities in the group of entities.

8. The method of claim 1, wherein the identifier associated with the signed digital certificate is one of a user name, an organization name, Media Access Control (MAC) address, or processor serial number.

9. A system to secure communications within a group of entities, the system comprising:
  a network interface to enable communications with one or more entities in the group of entities;
  a processor; and
  one or more memory resources storing instructions that, when executed by the processor, cause the processor to:
    receive, through the network interface, a designation as a certification authority to sign digital certificates for use by the entities within the group;
    create a group digital certificate and a group private key;
    create a digital certificate and private key for the certification authority;
    sign the digital certificate with the group private key;
    add the signed digital certificate to a group roster for the group;
    add an identifier for the certification authority to the group roster, the identifier being associated with the signed digital certificate for the certification authority;
    add one or more other entities in the group of entities to the group roster;
    distribute the group roster with the signed digital certificates associated with the certification authority and each of the one or more entities to the group; and
    after distributing the group roster, enable communications to be exchanged between the entities within the group, wherein enabling communications to be exchanged includes encrypting a communication that is to be transmitted from one entity to a second entity using the signed digital certificate associated with the second entity included in the group roster.

10. The system of claim 9, wherein adding one or more other entities in the group of entities to the group roster includes (i) receiving a digital certificate associated with the other entity, (ii) signing the received digital certificate associated with the other entity with the group private key, (iii) adding the signed digital certificate to a group roster, the group roster including a plurality of signed digital certificates associated with the entities of the group, and (iv) adding an identifier associated with the other entity to the group roster, the identifier being associated with the signed digital certificate associated with the other entity in the group roster.

11. The system of claim 9, wherein the one or more other entities verify a signature of the group roster by identifying that the signature cryptographically matches the group digital certificate.

12. The system of claim 9, wherein the group digital certificate is used to authenticate certificates of the one or more other entities that are to be admitted into the group.

13. The system of claim 9, wherein signing the digital certificate includes the certification authority computing a 50-100 byte sized digital signature of the digital certificate, encrypting the digital signature with the group private key, and annotating the digital certificate with the encrypted signature.

14. The system of claim 9, wherein entities include user accounts accessible by a user using a computing device, a computing device, a system, and a cluster of computing devices.

15. The system of claim 9, wherein the group roster includes the signed digital certificates for all entities in the group of entities.

16. The system of claim 9, wherein the identifier associated with the signed digital certificate is one of a user name, an organization name, Media Access Control (MAC) address, or processor serial number.

17. A non-transitory computer-readable medium that stores instructions, executable by one or more processors, to cause the one or more processors to perform operations that comprise:
  receiving a designation as a certification authority to sign digital certificates for use by entities within a group of entities;
  creating a group digital certificate and a group private key;
  creating a digital certificate and private key for the certification authority;
  signing the digital certificate with the group private key;
  adding the signed digital certificate to a group roster for the group;
  adding an identifier for the certification authority to the group roster, the identifier being associated with the signed digital certificate for the certification authority;
  adding one or more other entities in the group of entities to the group roster;
  distributing the group roster with the signed digital certificates associated with the certification authority and each of the one or more entities to the group; and
  after distributing the group roster, enabling communications to be exchanged between the entities within the group, wherein enabling communications to be exchanged includes encrypting a communication that is to be transmitted from one entity to a second entity using the signed digital certificate associated with the second entity included in the group roster.

* * * * *

UNITED STATES PATENT AND TRADEMARK OFFICE
CERTIFICATE OF CORRECTION

PATENT NO. : 9,218,475 B2 Page 1 of 1
APPLICATION NO. : 14/469429
DATED : December 22, 2015
INVENTOR(S) : Craig Fulmer Everhart et al.

It is certified that error appears in the above-identified patent and that said Letters Patent is hereby corrected as shown below:

On the Title Page, Item 72: replace "Pittsburg" with -- Pittsburgh --.

Signed and Sealed this
Fifth Day of July, 2016

Michelle K. Lee
*Director of the United States Patent and Trademark Office*